(12) United States Patent
Wenger et al.

(10) Patent No.: US 8,571,728 B1
(45) Date of Patent: Oct. 29, 2013

(54) SYSTEMS AND METHODS FOR EMBEDDING AIRCRAFT ATTITUDE DATA AND DETECTING INCONSISTENT AIRCRAFT ATTITUDE INFORMATION

(75) Inventors: Jason C. Wenger, Cedar Rapids, IA (US); Travis S. VanderKamp, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 490 days.

(21) Appl. No.: 12/708,103

(22) Filed: Feb. 18, 2010

(51) Int. Cl.
*G05D 1/00* (2006.01)
*B64G 1/24* (2006.01)
*G08B 23/00* (2006.01)
*G01S 13/00* (2006.01)
*G06K 9/46* (2006.01)

(52) U.S. Cl.
USPC ............... 701/4; 244/164; 340/967; 342/65; 382/194

(58) Field of Classification Search
USPC ........... 701/3, 4, 8, 14, 5, 6, 7, 11, 12, 15, 16, 701/17, 18, 468, 528, 529, 539, 120; 244/3.19, 3.15, 17.17, 185, 186, 220, 244/90 R, 164, 179–184; 340/959, 967, 979, 340/951, 970, 980, 971–975; 342/18, 34, 342/35, 49, 58, 63, 83, 81, 84, 87, 157, 199, 342/357.53, 65, 455, 29; 382/194, 199; 348/135, 245, 246, 247, 301, 308, 348/428.1; 345/612–614, 694–698, 3.3
See application file for complete search history.

(56) References Cited

U.S. PATENT DOCUMENTS

| | | | |
|---|---|---|---|
| 6,320,579 B1 * | 11/2001 | Snyder et al. ................ | 345/419 |
| 7,089,092 B1 * | 8/2006 | Wood et al. .................... | 701/14 |
| 7,630,797 B2 * | 12/2009 | Garceau et al. ................. | 701/3 |
| 7,860,302 B2 * | 12/2010 | Sato et al. ..................... | 382/154 |

* cited by examiner

*Primary Examiner* — Muhammad Shafi
(74) *Attorney, Agent, or Firm* — Donna P. Suchy; Daniel M. Barbieri

(57) ABSTRACT

Present novel and non-trivial systems and methods for embedding aircraft attitude data within a pixel data set and detecting inconsistent aircraft attitude information are disclosed. A pixel data set representative of the scene outside the aircraft is generated based upon the navigation data and the terrain data, attitude-exclusive data is generated based upon orientation data, and attitude-exclusive data is embedded into the pixel data set to form an embedded pixel data set. Attitude-exclusive data is comprised of attitude-exclusive pixel data having first and second pixel locations or attitude-exclusive ancillary data. Attitude-exclusive data is compared against separately-provided reference attitude data for the purpose of detecting inconsistent attitude information. Inconsistent attitude information is detected when at least one attitude measurement determined from either the attitude-exclusive pixel data or the attitude-exclusive ancillary data does not equal the respective attitude measurement of the reference attitude data.

18 Claims, 11 Drawing Sheets

SYSTEMS AND METHODS FOR EMBEDDING AIRCRAFT ATTITUDE DATA AND DETECTING INCONSISTENT AIRCRAFT ATTITUDE INFORMATION

BACKGROUND OF THE INVENTION

1. Field of the Invention

This invention pertains generally to the field of aircraft display units that provide flight information to the pilot or flight crew of an aircraft.

2. Description of the Related Art

The increased use of electronic flight displays and integrated modular avionics have allowed designers to integrate systems to a much higher degree than was practical with previous flight deck components. Although the integration may have made it easier to operate an aircraft, it has increased the complexity in detecting avionics failure conditions.

One possible failure condition is associated with the display of misleading or erroneous attitude information on a primary display unit. In order to prevent the display of misleading or erroneous attitude information, redundancies may be incorporated into the aircraft. For instance, attitude information provided by a plurality of systems may be compared with each other for inconsistencies. If inconsistencies are detected, then a failure condition may be triggered by informing the pilot and/or preventing the display of inconsistent attitude information.

Those skilled in the art know that attitude information (or orientation information) may be provided to a synthetic vision system for the generation of a pixel data set corresponding to the scene outside the aircraft, where such pixel data set provides scene-related data but not attitude data. After being generated, the pixel data set may be used to display the scene outside the aircraft on a pixel-by-pixel basis. If the pixel data set is not used as an attitude data source for the comparison of attitude information with another source and/or for the detection of inconsistent attitude information, then an opportunity for preventing the display of misleading or erroneous attitude information could be lost.

BRIEF SUMMARY OF THE INVENTION

The embodiments disclosed herein present non-trivial systems and methods for embedding aircraft attitude data within a pixel data set and detecting inconsistent aircraft attitude information. The embedding and detection embodiments disclosed herein may be used to enhance the safety of electronic flight display units by preventing the display of misleading or erroneous attitude information.

In one embodiment, a system is disclosed for embedding aircraft attitude data within a pixel data set. The system comprises a source of navigation data, a source of terrain data, and a pixel data set ("PDS") generator. After receiving data from each of these sources, the PDS generator may generate a pixel data set representative of the scene outside the aircraft based upon the navigation data and the terrain data. Then, the PDS generator may generate attitude-exclusive data based upon orientation data of the navigation data. Attitude-exclusive data may be comprised of attitude-exclusive pixel data having first and second pixel locations or attitude-exclusive ancillary data. Then, the PDS generator may embed the attitude-exclusive data into the pixel data set to form an embedded pixel data set. In an additional embodiment, the PDS generator may provide such embedded pixel data set to a data comparator for detecting inconsistent attitude information.

In another embodiment, a method is disclosed for embedding aircraft attitude data within a pixel data set. After position data, orientation data, and terrain data are received, a pixel data set representative of the scene outside the aircraft may be generated based upon the navigation data and the terrain data. Then, the attitude-exclusive data may be generated based upon orientation information of the navigation data. Then, the attitude-exclusive data may be embedded into the pixel data set to form an embedded pixel data set.

In another embodiment, a system is disclosed for detecting inconsistent aircraft attitude information. The system comprises a pixel data generator for providing attitude-exclusive data in an embedded pixel data set, a source for providing reference attitude data, and a data comparator. After receiving data from each of these sources, the data comparator may detect inconsistent attitude information by comparing the attitude-exclusive data of the embedded pixel data set with the reference attitude data; if inconsistent attitude data is not detected, then the embedded pixel data set may be considered as validated and ready for subsequent use. If inconsistent attitude data is not detected, the data comparator may send a signal to the pixel data generator to provide the embedded pixel data set to a display unit, wherein such embedded data set could be merged with attitude data to form an image data set; alternatively, if inconsistent attitude data is not detected, the data comparator may provide the embedded data set and reference attitude data to a display unit, where such embedded data set could be merged with reference attitude data to form an image data set. Once an image data set is formed, the display unit may present an image represented in such an image data set on the screen.

In another embodiment, a method is disclosed for detecting inconsistent aircraft attitude information. After receiving attitude-exclusive data from a pixel data generator and attitude reference data from an applicable source, inconsistent attitude information may be detected by comparing the attitude-exclusive data of the embedded pixel data set with the reference attitude data. If inconsistent attitude data is not detected, a signal may be sent to the pixel data generator to provide the embedded pixel data set to a display unit, wherein such embedded data set could be merged with attitude data to form an image data set; alternatively, if inconsistent attitude data is not detected, the data comparator may provide the embedded data set and reference attitude data to a display unit, where such embedded data set could be merged with reference attitude data to form an image data set. Once the image data set is formed, the display unit may present an image represented in the image data set on the screen.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
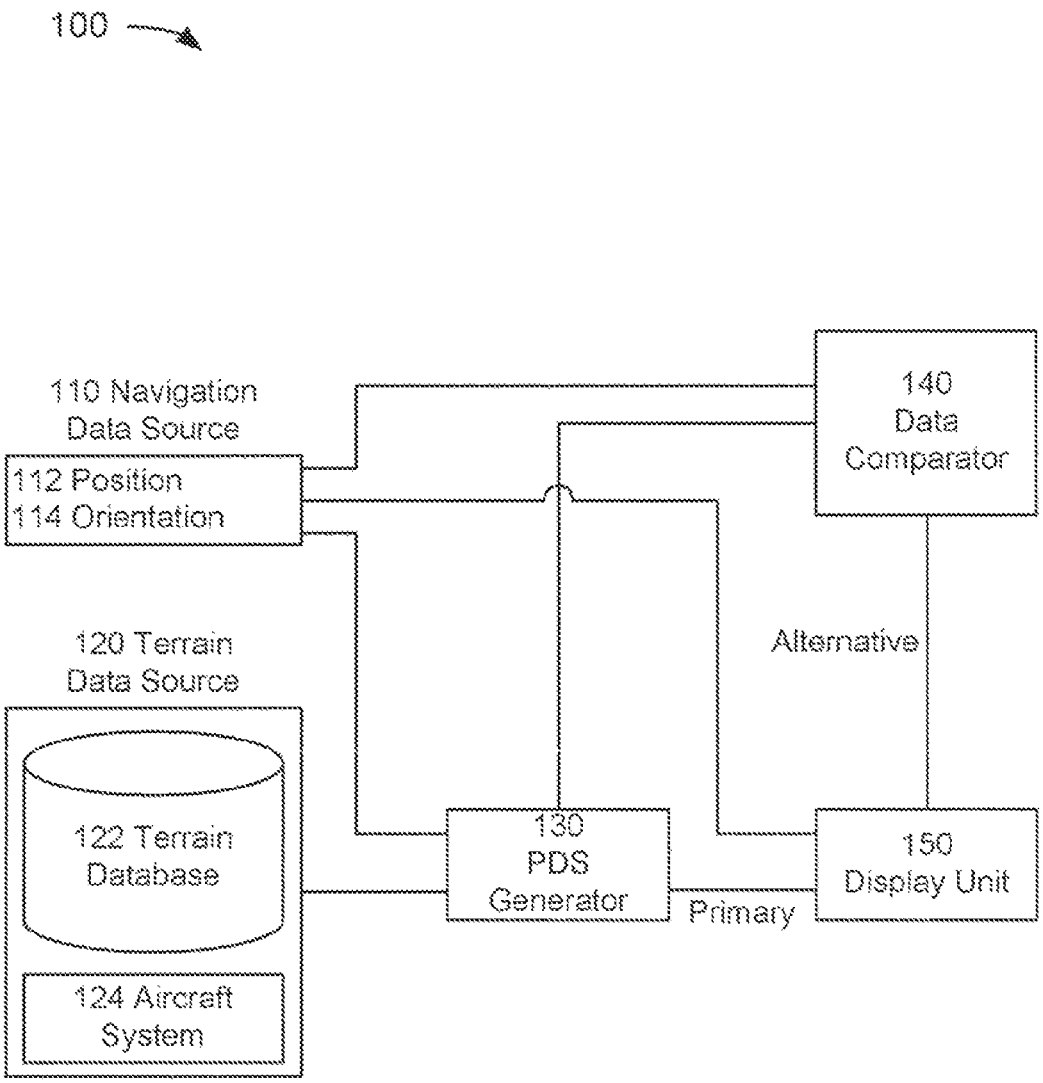
FIG. 1 depicts a block diagram of a combined system for an attitude data embedding and detecting inconsistent attitude information.

FIG. 1 depicts a block diagram of a combined system 100 for embedding attitude data and detecting inconsistent attitude information suitable for implementation of the techniques described herein. The combined system 100 of an embodiment of FIG. 1 includes a navigation data source 110, a terrain data source 120, a pixel data set generator 130, a data comparator 140, and a display unit 150.

In an embodiment of FIG. 1, the navigation data source 110 comprises the system or systems that could provide navigation data information in an aircraft. It should be noted that data, as embodied herein for any source or system in an aircraft including a navigation system, could be comprised of any analog or digital signal, either discrete or continuous, which could contain information. As embodied herein, data and signals are treated synonymously. Aircraft could mean any vehicle which is able to fly through the air or atmosphere including, but not limited to, lighter than air vehicles and heavier than air vehicles, wherein the latter may include fixed-wing and rotary-wing vehicles.

The navigation data source 110 may include, but is not limited to, an air/data system, an attitude heading reference system, an inertial guidance system (or inertial reference system), a global navigation satellite system ("GNSS") (or satellite navigation system), and/or a flight management computing system, all of which are known to those skilled in the art. For the purposes of the embodiments herein, a radio altimeter system may be included in the navigation data source 110; a radio altimeter system is known to those skilled in the art for determining the altitude above the surface over which the aircraft is currently operating. As embodied herein, the navigation data source 110 could be a source for providing navigation data including, but not limited to, aircraft position data 112 and aircraft orientation data 114. As embodied herein, position data 112 could comprise geographic position (e.g., latitude and longitude coordinates) and altitude. Also, orientation data 114 could include data representative of pitch attitude, roll attitude, yaw attitude, and/or heading information related to the attitude of the aircraft. As embodied herein, navigation data may be provided to the pixel data set generator 130, the data comparator 140, and/or the display unit 150 for subsequent processing as discussed herein.

In an embodiment of FIG. 1, the terrain data source 120 may include, but is not limited to, a terrain database 122, other aircraft systems 124, or any combination thereof. The terrain data source 120 could comprise any source of terrain data, obstacle data, other manmade or natural features, geopolitical boundaries, or any combination thereof. Obstacles may include, but are not limited to, towers, buildings, poles, wires, other manmade structures, and foliage. As embodied herein, obstacles and obstructions are treated synonymously.

The terrain database 122 may be any database used to store terrain data contained in digital elevation models ("DEM"). Generally, the terrain data of a DEM is stored as grids composed of cells, and each grid or cell represents an area of terrain. A grid or cell may be of various shapes. For example, a grid or cell may be defined in arc-seconds of latitude and longitude, or may be rectangular, square, hexagonal, or circular. A grid or cell may also be of differing resolutions. For instance, the U.S. Geological Survey developed GTOPO30, a global DEM which may provide 30 arc-seconds (approximately 900 meters) resolution. On the other hand, the Space Shuttle Endeavour in February 2000 acquired elevation data known as Shuttle Radar Topography Mission ("SRTM") terrain elevation data which may provide generally one arc-second (or approximately 30 meters) resolution, providing much greater detail than that provided with the GTOPO30 data set. At the present time, resolutions of one-arc second for SRTM terrain data are available for areas over the United States; for all other locations, resolutions of three arc-seconds (approx. 90 meters) are available. In addition to these public sources of terrain data, there are military and private sources of terrain data Various vendors and designers of avionics equipment have developed databases that have been, for all intents and purposes, proprietary in nature.

It should be noted that data contained in any database discussed herein including the terrain database 122 may be stored in a digital memory storage device or computer-readable media including, but not limited to, RAM, ROM, CD, DVD, hard disk drive, diskette, solid-state memory, PCMCIA or PC Card, secure digital cards, and compact flash cards. Data contained in such databases could be loaded while an aircraft is on the ground or in flight. Data contained in such databases could be provided manually or automatically through an aircraft system capable of receiving and/or providing such manual or automated data. Data contained in such databases could be temporary in nature; for example, data representative of a temporary obstacle could be stored in the terrain database 122. Any database used in the embodiments disclosed herein may be a stand-alone database or a combination of databases. For example, the terrain database 122 may be associated with a terrain awareness and warning system ("TAWS") only.

Other aircraft systems 124 could employ the terrain database 122, where such systems could also comprise the terrain data source 120. In one example, a synthetic vision system ("SVS") may employ a terrain database for the generation of terrain image data. As embodied herein, terrain data may be provided to the pixel data set generator 130 for subsequent processing as discussed herein.

In an embodiment of FIG. 1, the pixel data set ("PDS") generator 130 could receive input data from various sources including, but not limited to, the navigation data source 110 and the terrain data source 120. The PDS generator 130 could be employed to accomplish some of the processes and/or procedures disclosed herein including, but not limited to, the method corresponding to flowchart 200 below. The PDS generator 130 could provide output data to various systems and/or components including, but not limited to, the data comparator 140 and/or the display unit 150. As embodied herein, the PDS generator 130 comprises the primary source of an embedded pixel data set as discussed in detail below.

The PDS generator 130 and the data comparator 140 may each comprise any processor and/or electronic data processing unit which executes software or source code stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. Processors and/or electronic data processing units may be driven by the execution of software or source code containing algorithms developed for the specific functions embodied herein. Common examples of processors and/or electronic data processing units are microprocessors, Digital Signal Processors (DSPs), Programmable Logic Devices (PLDs), Programmable Gate Arrays (PGAs), and signal generators; however, for the embodiments herein, the term processor is not limited to such processing units and its meaning is not intended to be construed narrowly. A processor could also consist of one or more electronic data processing units. As embodied herein, the PDS generator 130 could be a processor(s) used by or in conjunction with any other system of the aircraft including, but not limited to, a processor(s) incorporated into a synthetic vision system. The data comparator 140 could be a processor(s) used by or in conjunction with any other system of the aircraft including, but not limited to, a processor(s) incorporated into an indicating system.

In an embodiment of FIG. 1, the data comparator 140 could receive input data from various sources including, but not limited to, the navigation data source 110 and the PDS generator 130. The data comparator 140 could be employed to accomplish some of the processes and/or procedures disclosed herein including, but not limited to, the method corresponding to flowchart 300 below. The data comparator 140 could provide output data to various systems and/or components including, but not limited to, the PDS generator 130 and/or the display unit 150. As embodied herein, data comparator 140 comprises the alternative source of an embedded pixel data set as discussed in detail below.

In an embodiment of FIG. 1, the display unit 150 could comprise any unit which presents symbolic flight information to the crew of the aircraft including, but not limited to, a Head-Down Display ("HDD") unit and/or a Head-Up Display ("HUD") unit. An HDD unit is typically a unit mounted to an aircraft's flight instrument panel located in front of a pilot and below the windshield and the pilot's field of vision.

A HUD unit is mounted in front of the pilot at windshield level and is directly in the pilot's field of vision. A HUD system is advantageous because the display is transparent allowing the pilot to keep his or her eyes "outside the cockpit" while the display unit provides flight information to the pilot.

The display unit 150 could display the same information found on a primary flight display ("PFD"), such as "basic T" information (i.e., airspeed, attitude, altitude, and heading). Although it may provide the same information as that of a PFD, the display unit 150 may also display a plurality of indications or information including, but not limited to, selected magnetic heading, actual magnetic track, selected airspeeds, selected altitudes, altitude barometric correction setting, vertical speed displays, flight path angle and drift angles, flight director commands, limiting and operational speeds, mach number, radio altitude and decision height, final approach trajectory deviations, and marker indications. The display unit 150 is designed to provide flexible configurations which may be tailored to the desired configuration specified by a buyer or user of the aircraft.

Figure 2A:
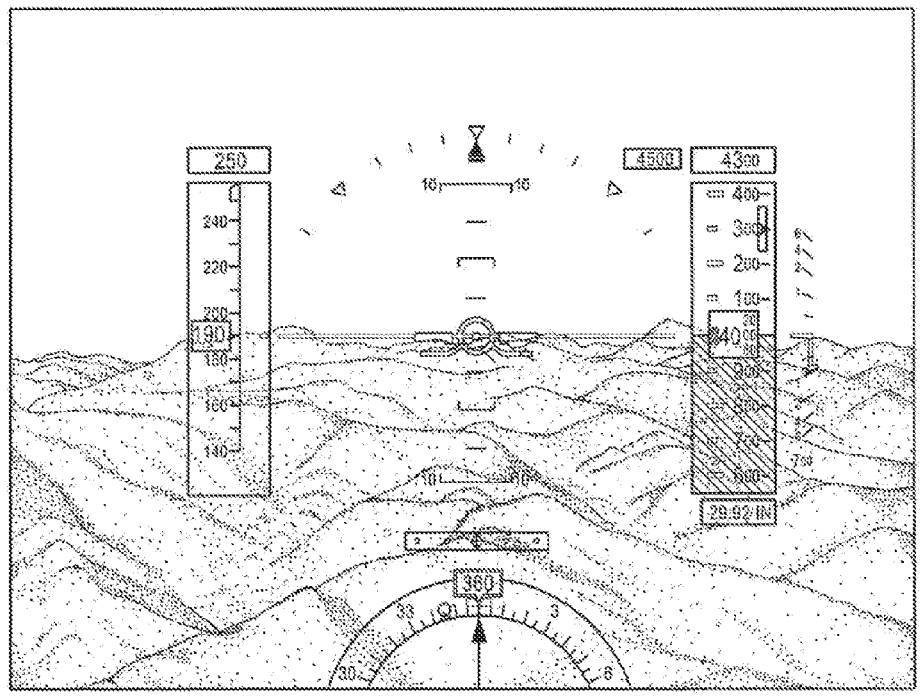
FIG. 2A depicts an exemplary depiction of an HDD unit.

FIG. 2A provides an exemplary depiction of an HDD unit for presenting information to the pilot or flight crew against the background of a three-dimensional image of terrain and sky; an HDD unit could be employed as a display unit in an indicating system. It should be noted that the information or symbology depicted on the HDD unit of FIG. 2A has been made minimal for the sake of presentation and is not indicative of the plurality of indications or information with which it may be configured.

Figure 2B:
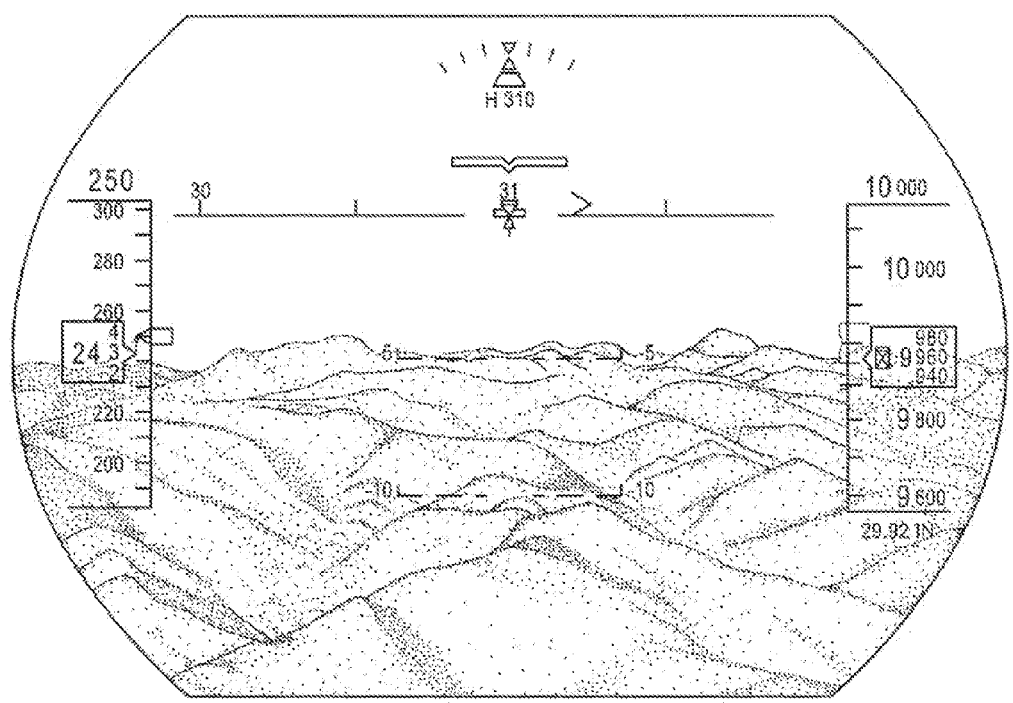
FIG. 2B depicts an exemplary depiction of a HUD unit.

FIG. 2B provides an exemplary depiction of a HUD unit for presenting information to the pilot or flight crew against the background of a three-dimensional image of terrain; similar to the HDD unit of FIG. 2A, a HUD unit could be employed as a display unit in an indicating system. It should be noted that the tactical information or symbology depicted on both the HDD unit of FIG. 2A and the HUD unit of FIG. 2B has been made minimal for the sake of presentation and is not indicative of the plurality of indications or information with which it may be configured. Because the indications or information shown in the drawings of FIGS. 2A and 2B are well-known to those skilled in the art, a discussion of the specific tactical information shown on them is not provided herein.

Figure 3:
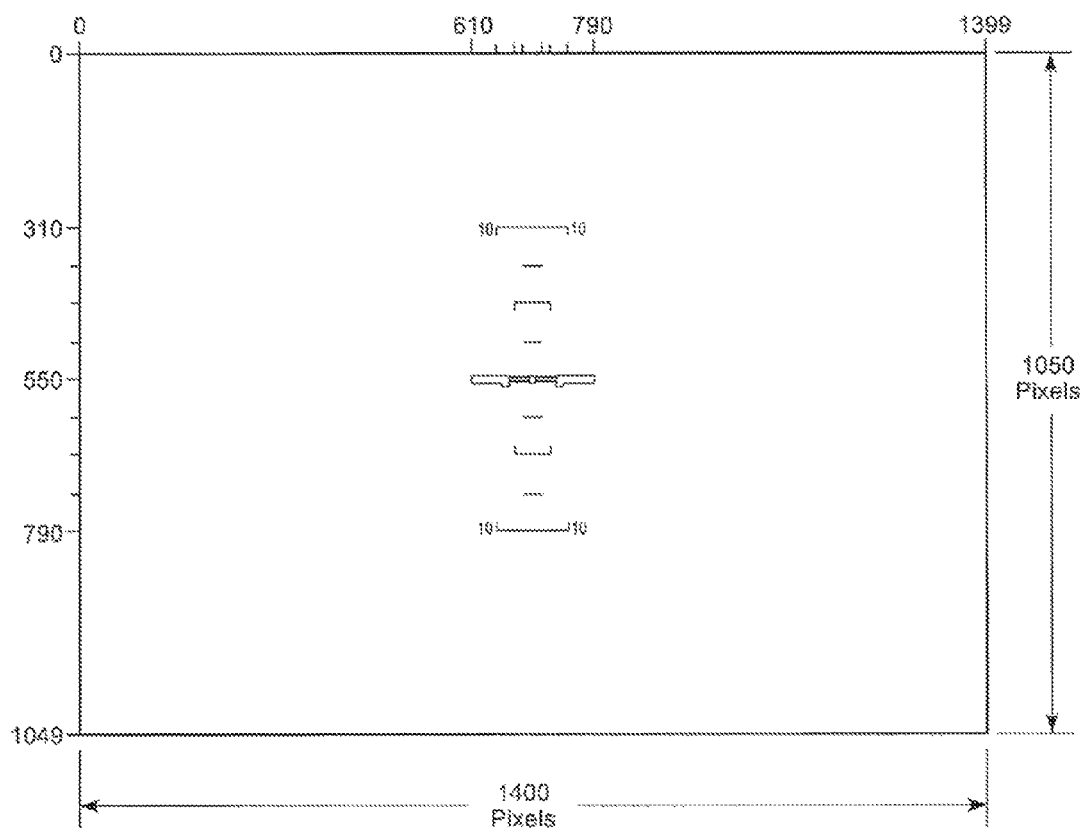
FIG. 3 depicts the display area of a rectangular screen of an HDD unit.

The advantages and benefits of the embodiments discussed herein may be illustrated by showing examples of how a pixel data set generated by the PDS generator 130 may embed attitude data. Referring to FIG. 3, the illustration provides a depiction of symbolic pitch attitude scale (also known to those skilled in the art as pitch symbology and/or pitch tape) of FIG. 2A that could be displayed on a screen of the display unit 150. The generation of data representative of attitude symbology is known to those skilled in the art.

FIG. 3 provides an illustration of the display area of a rectangular screen of the HDD unit of FIG. 2A. For the purposes of discussion only and not of limitation, the discussions and illustrations of FIGS. 4 through 9, inclusive, will be drawn to the rectangular screen of FIG. 3. The display area of the screen is assumed to have a horizontal width of 1400 pixels extending between columns 0 and 1399 and a vertical width of 1050 pixels extending between rows 0 and 1049. Although the remainder of the discussion will be drawn to the screen of FIG. 3, the embodiments herein may be applied to a display unit of any shape configured for presenting an image of symbology and terrain such as, but not limited to, the HUD unit shown in FIG. 2B.

FIG. 3 depicts pitch symbology centered on the wings of a miniature aircraft. Data comparator 140 may generate attitude symbology data based upon aircraft orientation data 114.

Algorithms used in the generation of symbology data are known to those skilled in the art. The values shown in the table of FIG. 3 highlight the configuration of the symbology which has been made in reference to a straight-and-level flight attitude, i.e., zero pitch, roll, and yaw. The miniature aircraft is centered along the pixel row of 550 and is 180 pixels in length (the difference between rows 610 and 790). The scale of pitch attitude extends a total of 20 degrees, from 10 degrees pitch down to 10 degrees pitch up. The scale has been divided with four markings on each side of the miniature aircraft to indicate equal spacings of 2.5 degrees. To provide ease of reading pitch attitude, each marking has been configured with a different length from the adjacent marking(s). Referring to the table shown in FIG. 3, the lengths of the various markings may be determined from the values provided for the first and second pixel columns: +10.0 and −10.0 markings have a length of 120 pixels, the +5.0 and −5.0 markings have a length of 60 pixels, and the +7.5, +2.5, −2.5, and −7.5 markings have a length of 30 pixels.

As shown in the table of FIG. 3, +10.0 and −10.0 degree markings correspond to pixel rows 310 and 790, a difference of 480 pixel rows. Because the graduations are linear (i.e., equally spaced), the configuration of the scale may be determined: 24 pixel rows per one degree of pitch. It should be noted that, although the discussion of the examples provided herein will be drawn to linear graduations, the embodiments disclosed herein are not limited to linearly-graduated attitude scales but may be applied to attitude scales configured with non-linear graduations as disclosed by Wenger et al in U.S. patent application Ser. No. 12/708,163 entitled "System, Module, and Method for Generating Non-Linearly Spaced Graduations for a Symbolic Linear Scale."

Figure 4A:
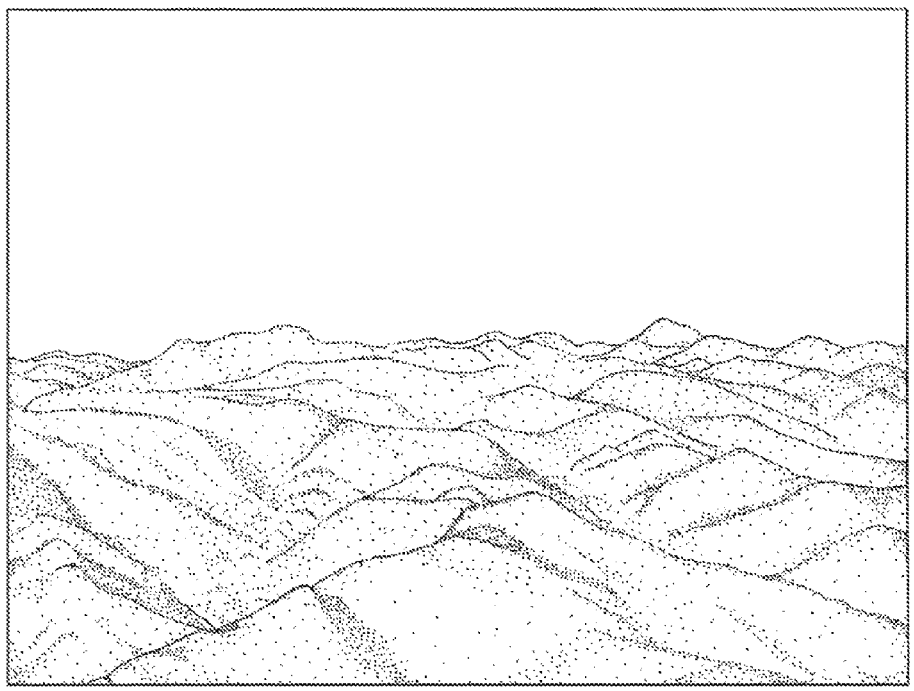
FIG. 4A depicts a three-dimensional perspective image corresponding to a pixel data set.

The drawings of FIG. 4 depict three-dimensional perspective images of a scene outside the aircraft with an aircraft operating in a straight-and-level flight attitude corresponding to a pixel data set generated by the PDS generator 130 without the novel embodiments disclosed herein. The illustration of FIG. 4A depicts the image without pixel margins. The PDS generator 130 may generate the pixel data set representative of the scene image and scale such data to fit a screen view by algorithms known to those skilled in the art. For the display area of a screen having a horizontal width of 1400 pixels and a vertical width of 1050 pixels, the pixel data set could have 1400 columns extending between columns 0 and 1399 and 1050 rows extending between rows 0 and 1049.

After the pixel data set has been generated by the PDS generator 130, it may be provided to the data comparator 140. Assuming the data comparator 140 is not configured with the novel embodiments disclosed herein, the data comparator 140 may merge the symbology data with the pixel data set of 1400 pixels by 1050 pixels into an image data set and provide the image data set to the display unit 150, where the display unit 150 presents an image of attitude symbology against the background of the three-dimensional scene outside of the aircraft; the illustration of FIG. 2A provides an exemplary depiction of such image.

In an embodiment disclosed herein, the generation of the pixel data set could include the establishing of a reference line based on the attitude of the aircraft. Such reference line could be a line corresponding to a horizon line located in the scene outside of the aircraft, where the location of the horizon line changes with changes in the aircraft attitude. To match the depiction of symbology, a configuration may be selected so that the reference line corresponds oppositely to pixel row location of the screen of the display unit 150. For example, the reference line could be assigned pixel row 550 for straight-and-level flight attitude, pixel row 790 for a pitch attitude of +10.0 degrees, and pixel row 310 for a pitch attitude of −10.0 degrees, which are the same values shown in the table of FIG. 3. Where a reference line has been established during the generation of the pixel data set, pixel locations of the end points of the reference line could be used in to detect inconsistent attitude information as embodied herein.

Figure 4B:
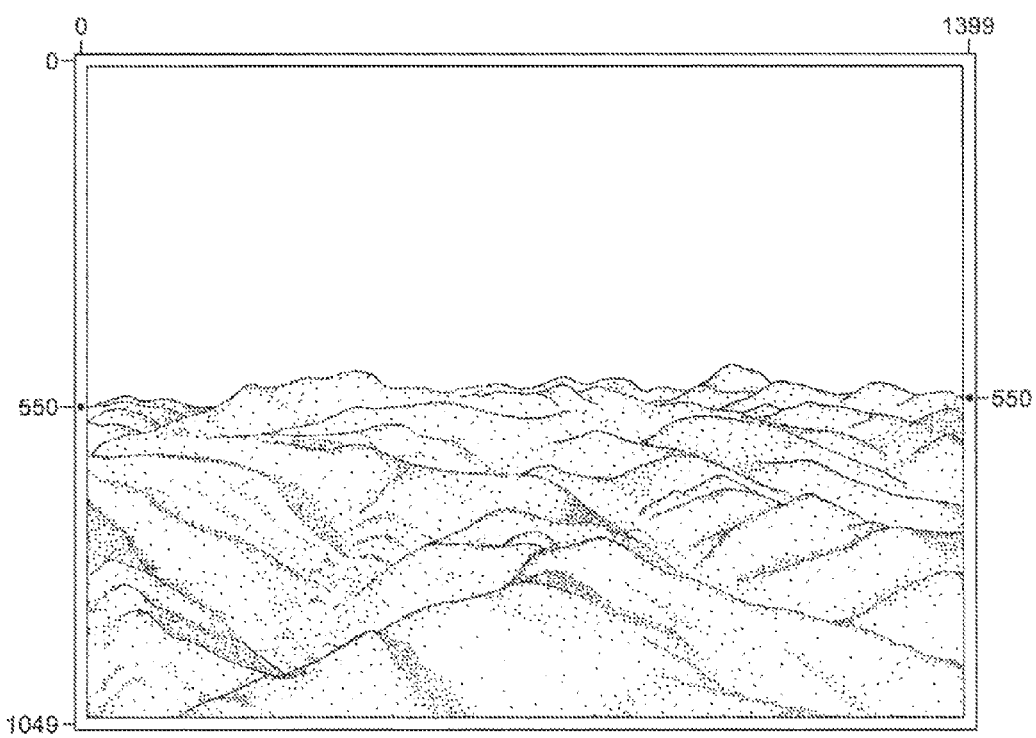
FIG. 4B depicts a three-dimensional perspective image corresponding to an embedded pixel data set.

The illustration of FIG. 4B depicts both a three-dimensional perspective image of the scene outside the aircraft and pixel margins (which is not to scale but has been intentionally exaggerated for the sake of illustration) embedded in the pixel data set generated by the PDS generator 130. Pixel columns 1 through 1398 and pixel rows 1 through 1048 of the pixel data set comprise pixel data representative of the scene, i.e., scene-representative pixels. Pixel columns 0 and 1399 and pixel rows 0 and 1049 of the pixel data set comprise pixel data representative of pixel margins and are void of pixel data representative of the scene; instead, these specific rows and columns have been reserved for attitude-exclusive pixels corresponding to end points of the reference line (not shown). Because a straight-and-level flight attitude has been assumed for the drawings of FIG. 4, the PDS generator 130 has established a reference line at row 550 only between columns 0 and 1399 as indicated in FIG. 4B by the attitude-exclusive pixels at first and second pixel locations (0, 550) and (1399, 550) embedded into the pixel data set, where such attitude-exclusive pixels correspond to the end points of the reference line.

After the embedded pixel data set has been generated by the PDS generator 130, it may be provided to data comparator 140 for the detecting of attitude information inconstant with a reference attitude data by employing, for example, the method corresponding to flowchart 300 below. If inconsistent attitude information is not detected, the data comparator 140 may merge the reference attitude data with a subset of the embedded pixel data set comprising pixel columns 1-1398 and pixel rows 1-1048 into an image mage data set comprising pixel columns 1 through 1398 and pixel rows 1 through 1048. Then, the data comparator 140 may provide the image data set to the display unit 150, where the display unit 150 presents an image of attitude symbology against the background of the three-dimensional scene outside of the aircraft, where such image is surrounded by one-pixel margins due to the omission or exclusion of pixel data in columns 0 and 1399 and pixel rows 0 and 1049 in the embedded pixel data set subset.

Figure 5A:
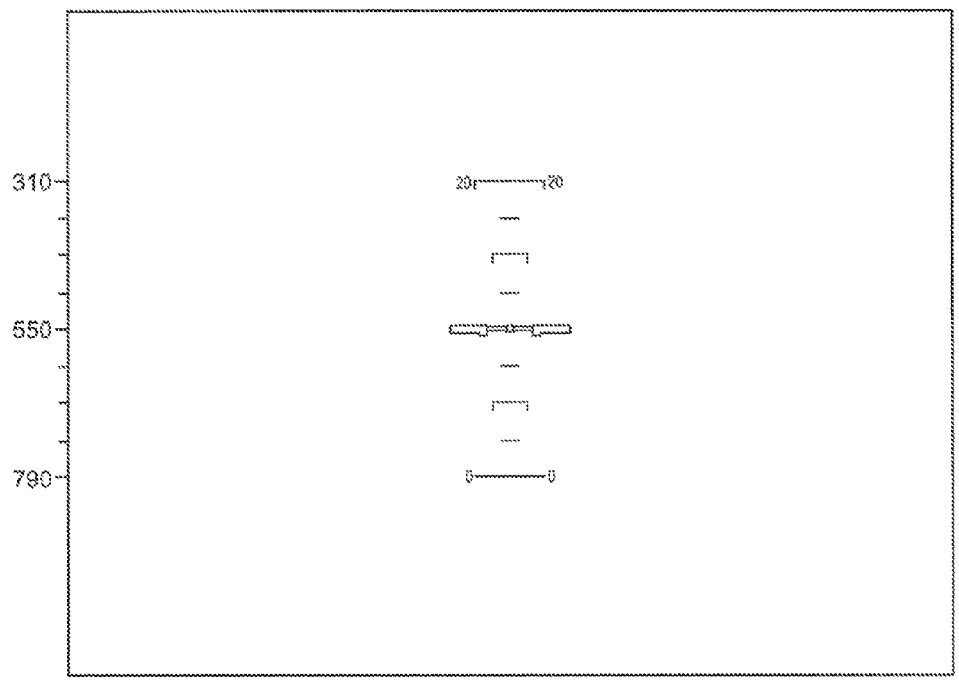
FIG. 5A depicts symbology indicating +10 degrees pitch attitude.
Figure 5B:
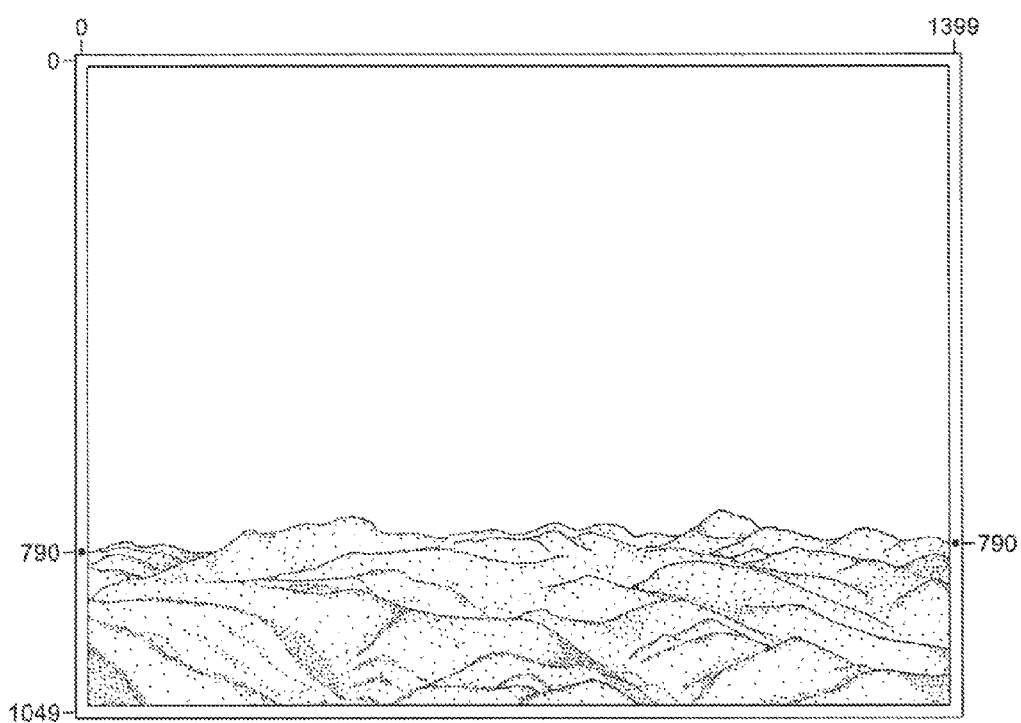
FIG. 5B depicts the scene outside an aircraft operating at +10 degrees pitch attitude as represented in an embedded pixel data set comprised of scene-representative data and attitude-exclusive pixel data.

The drawings of FIG. 5 are illustrations indicative of an aircraft operating at +10 degrees pitch attitude. FIG. 5A depicts symbology indicating +10 degrees pitch attitude, where the data comparator 140 could have generated data representative of such symbology based upon orientation data 114. FIG. 5B depicts an image represented in an embedded pixel data set comprised of scene-representative data and attitude-exclusive pixel data that could have been generated by the PDS generator 130. As shown in FIG. 5B, data representative of the scene outside of aircraft corresponds to pixel columns 1 through 1398 and pixel rows 1 through 1048 of the embedded pixel data set, and data representative of +10 degrees pitch attitude corresponds to first pixel location (0, 790) and second pixel location (1399, 790).

Figure 6A:
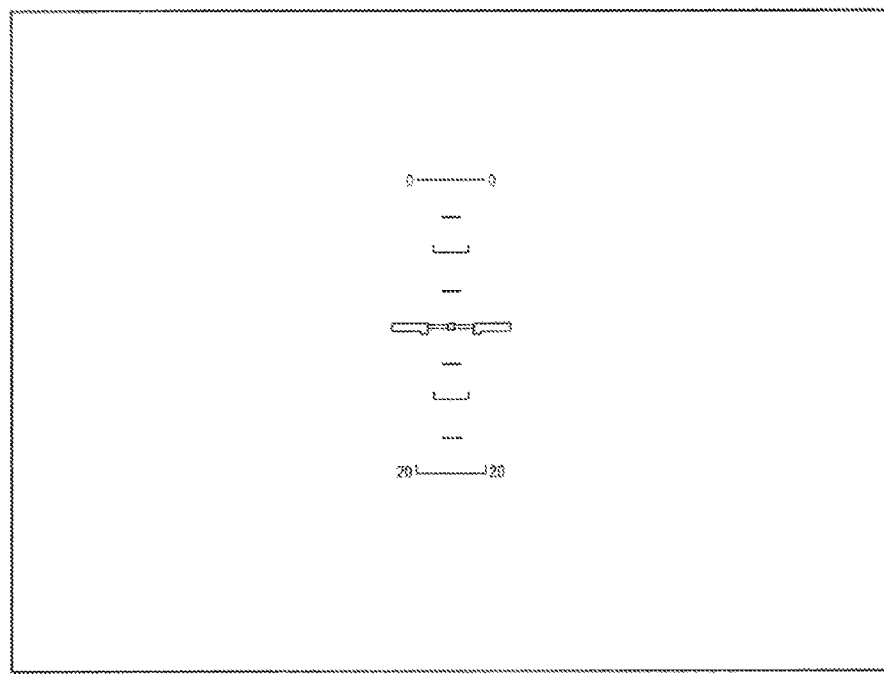
FIG. 6A depicts symbology indicating −10 degrees pitch attitude.
Figure 6B:
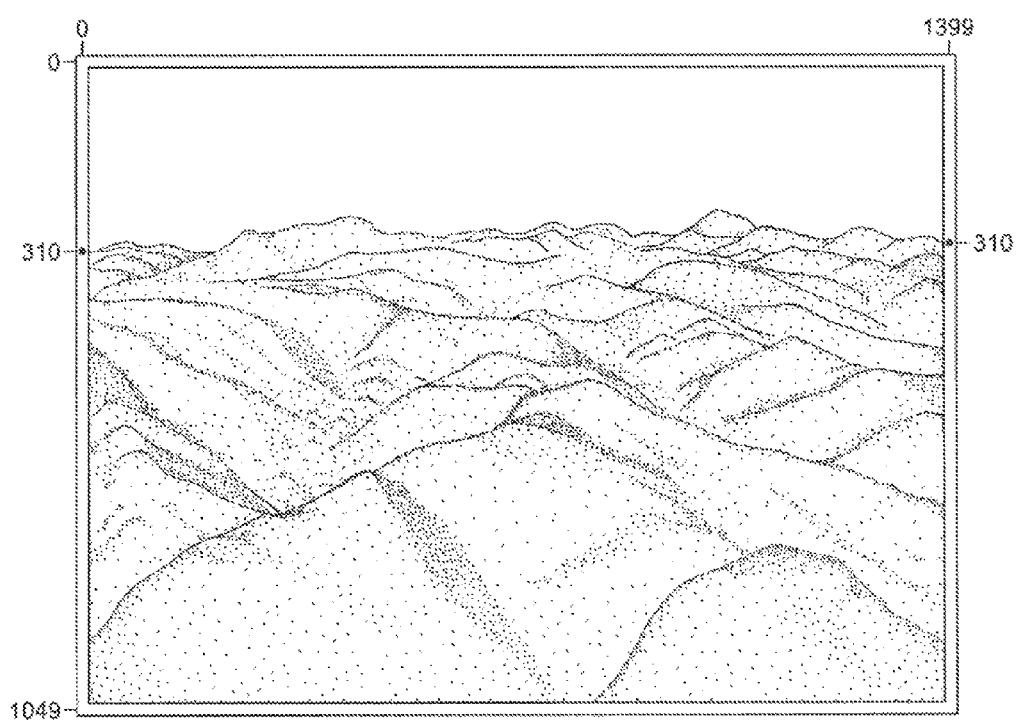
FIG. 6B depicts the scene outside an aircraft operating at −10 degrees pitch attitude as represented in an embedded pixel data set comprised of scene-representative data and attitude-exclusive pixel data.

The drawings of FIG. 6 are illustrations indicative of an aircraft operating at −10 degrees pitch attitude. FIG. 6A depicts symbology indicating −10 degrees pitch attitude, where the data comparator 140 could have generated data representative of such symbology based upon orientation data 114. FIG. 6B depicts an image represented in an embedded pixel data set comprised of scene-representative data and attitude-exclusive pixel data that could have been generated by the PDS generator 130. As shown in FIG. 6B, data representative of the scene outside of aircraft corresponds to pixel columns 1 through 1398 and pixel rows 1 through 1048 of the embedded pixel data set, and data representative of −10 degrees pitch attitude corresponds to first pixel location (0, 310) and second pixel location (1399, 310).

Figure 7A:
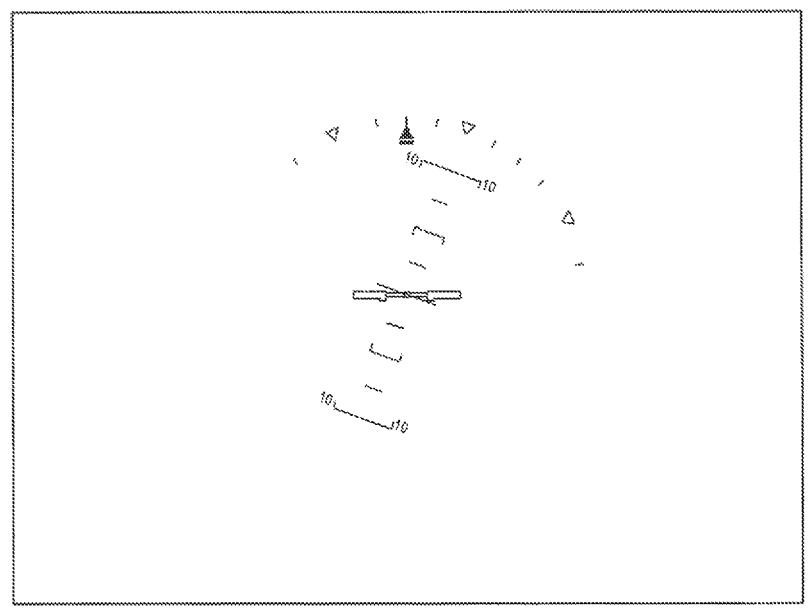
FIG. 7A depicts symbology indicating −20 degrees roll attitude.
Figure 7B:
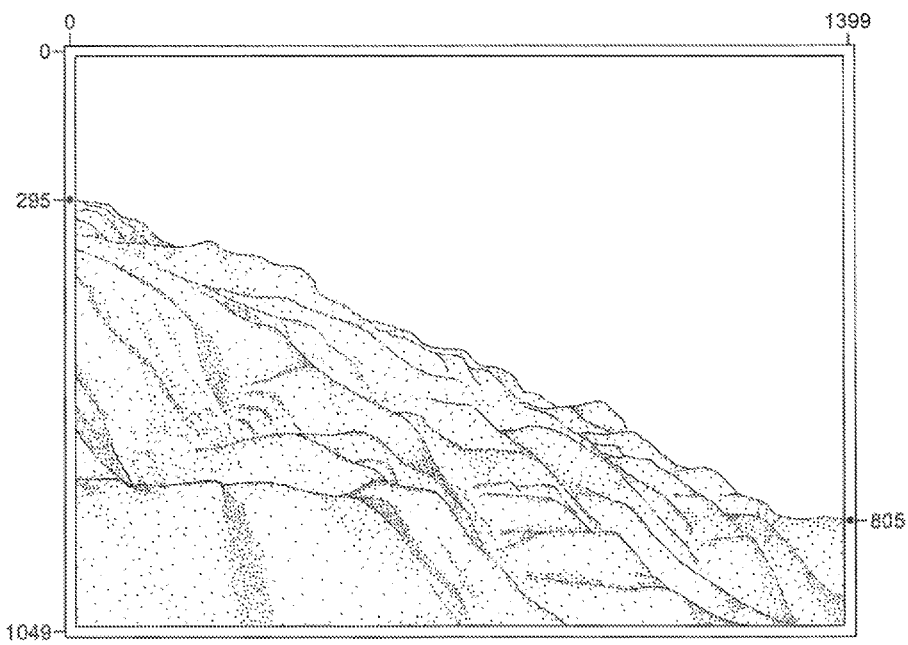
FIG. 7B depicts the scene outside an aircraft operating at −20 degrees roll attitude as represented in an embedded pixel data set comprised of scene-representative data and attitude-exclusive pixel data.

The drawings of FIG. 7 are illustrations indicative of an aircraft operating at −20 degrees roll attitude (the negative sign indicates a roll to the left). FIG. 7A depicts symbology indicating such attitudes, where the data comparator 140 could have generated data representative of such symbology based upon orientation data 114. FIG. 7B depicts an image represented in an embedded pixel data set comprised of scene-representative data and attitude-exclusive pixel data that could have been generated by the PDS generator 130. As shown in FIG. 7B, data representative of the scene outside of aircraft corresponds to pixel columns 1 through 1398 and pixel rows 1 through 1048 of the embedded pixel data set, and data representative of −20 degrees roll attitude corresponds to first pixel location (0, 295) and second pixel location (1399, 805).

In determining the locations of the attitude-exclusive pixels in FIG. 7B, the PDS generator 130 could have been configured to determine a reference line decreasing in a 20 degree slope from left to right. Because there are 1400 pixels across the screen horizontally and the tangent of 20 degrees has an approximate value of 0.34397, the reference line would have to drop a distance of approximately 510 pixel rows in its run between columns 0 and 1399. This means that the left end point (i.e., first pixel location) of the reference line would be 255 pixels above the pitch attitude midpoint, and the right end point (i.e., second pixel location) would be 255 pixels below, where the pitch attitude midpoint would be located at row 550 for a pitch attitude of zero degrees. Therefore, the left end point would be in column 0 at row 295 (550-255), and the right end point would be in column 1399 at row 805 (550+ 255).

Figure 8A:
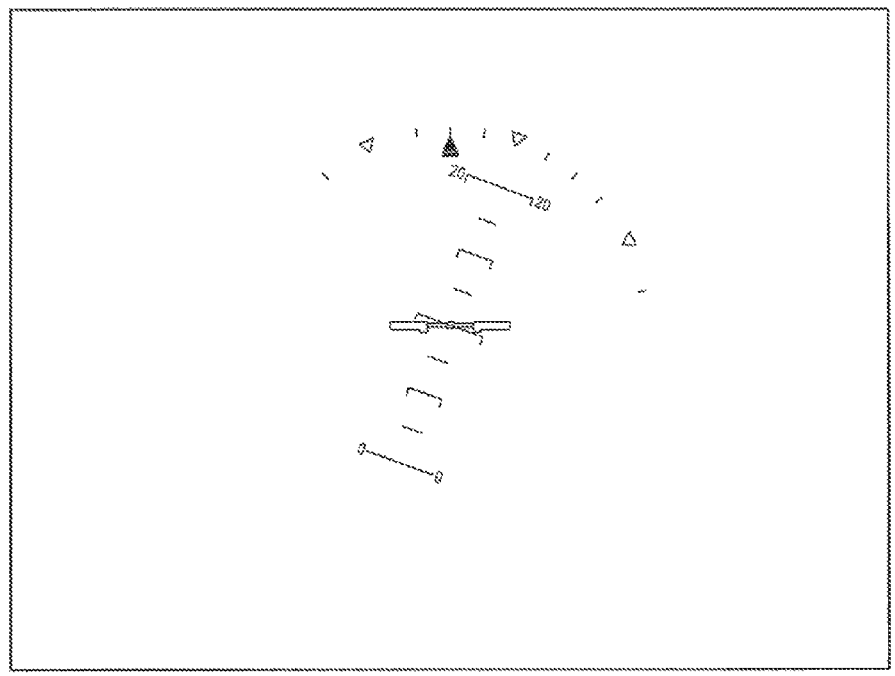
FIG. 8A depicts symbology indicating −20 degrees roll attitude and +10 pitch attitude.
Figure 8B:
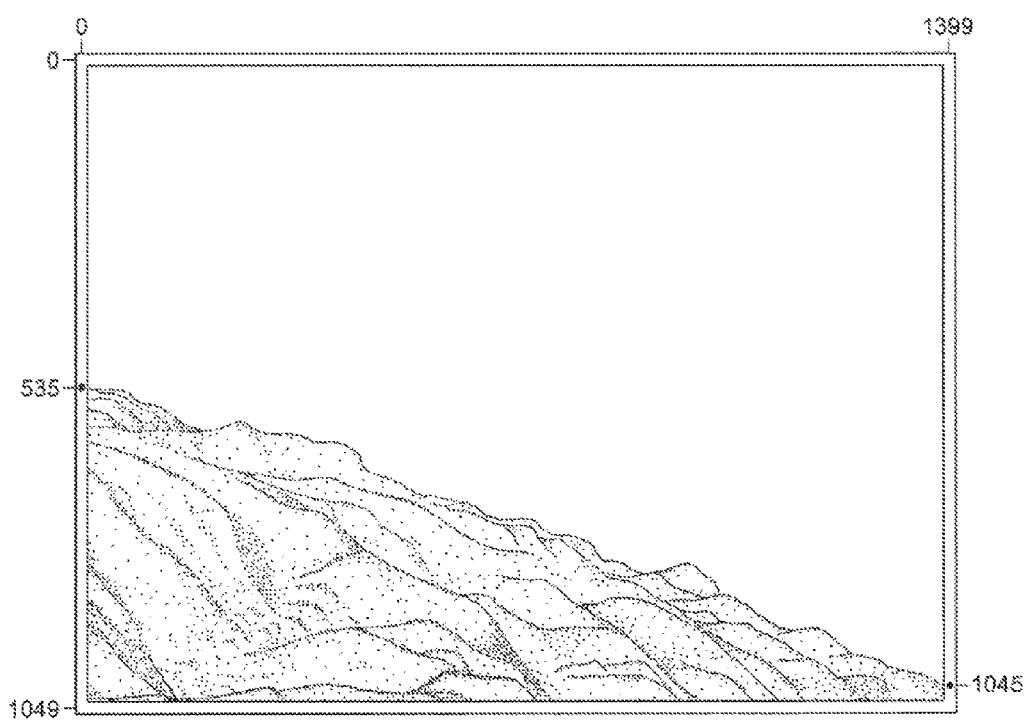
FIG. 8B depicts the scene outside an aircraft operating at −20 degrees roll attitude and +10 degrees pitch attitude as represented in an embedded pixel data set comprised of scene-representative data and attitude-exclusive pixel data.

The drawings of FIG. 8 are illustrations indicative of an aircraft operating at −20 degrees roll attitude and +10 pitch attitude. FIG. 8A depicts symbology indicating such attitudes, where the data comparator 140 could have generated data representative of such symbology based upon orientation data 114. FIG. 8B depicts an image represented in an embedded pixel data set comprised of scene-representative data and attitude-exclusive pixel data that could have been generated by the PDS generator 130. As shown in FIG. 8B, data representative of the scene outside of aircraft corresponds to pixel columns 1 through 1398 and pixel rows 1 through 1048 of the embedded pixel data set, and data representative of −20 degrees roll attitude and +10 pitch attitude corresponds to first pixel location (0, 530) and second pixel location (1399, 1045).

As discussed above, a −20 degrees roll attitude means that the left end point of the reference line would be 255 pixels above the pitch attitude midpoint, and the right end point would be 255 pixels below. Because the pitch attitude is +10 degrees, the pitch attitude midpoint would be vertically displaced to the location of 790. Therefore, the left end point would be in column zero at row 535 (790−255), and the right end point would be in column 1399 at row 1045 (790+255).

Figure 9A:
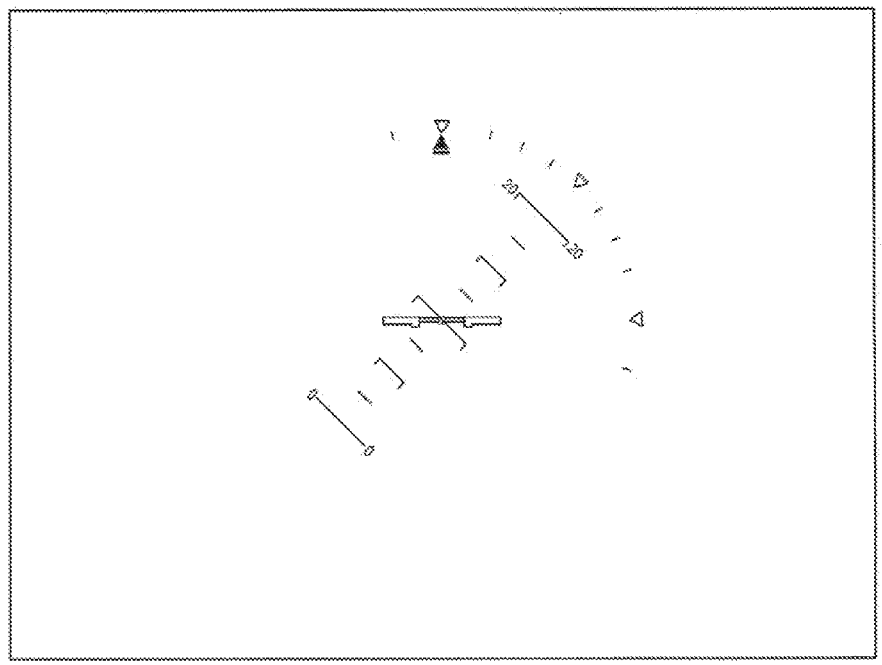
FIG. 9A depicts symbology indicating −45 degrees roll attitude and +10 pitch attitude.
Figure 9B:
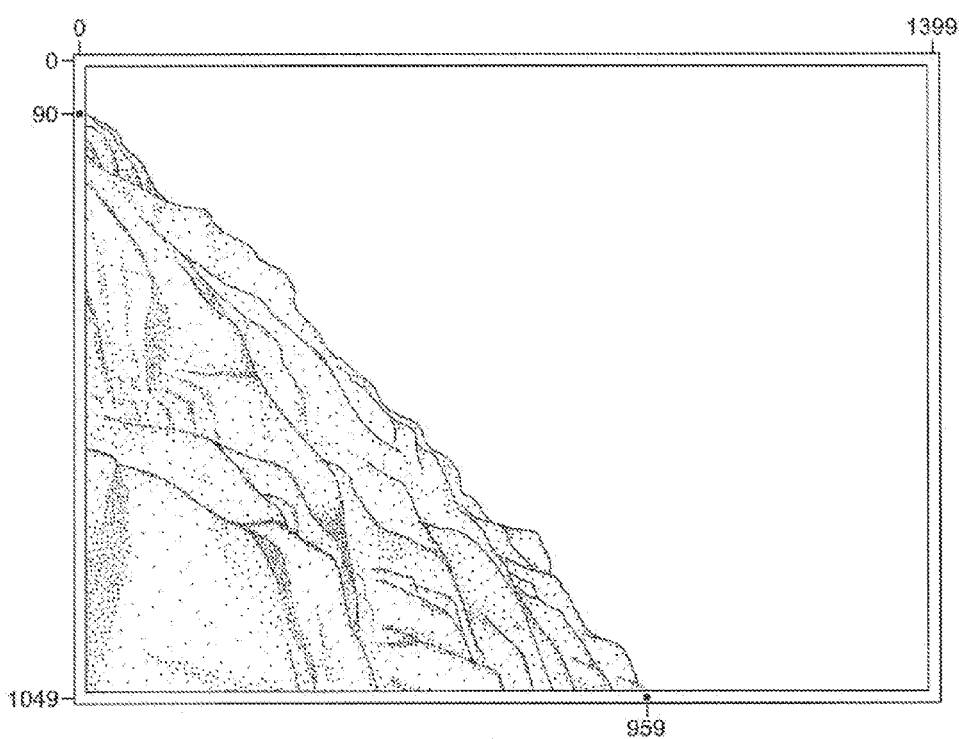
FIG. 9B depicts the scene outside an aircraft operating at −45 degrees roll attitude and +10 degrees pitch attitude as represented in an embedded pixel data set comprised of scene-representative data and attitude-exclusive pixel data.

The drawings of FIG. 9 are illustrations indicative of an aircraft operating at −45 degrees roll attitude and +10 pitch attitude. FIG. 9A depicts symbology indicating such attitudes, where the data comparator 140 could have generated data representative of such symbology based upon orientation data 114. FIG. 9B depicts an image represented in an embedded pixel data set comprised of scene-representative data and attitude-exclusive pixel data that could have been generated by the PDS generator 130. As shown in FIG. 9B, data representative of the scene outside of aircraft corresponds to pixel columns 1 through 1398 and pixel rows 1 through 1048 of the embedded pixel data set, and data representative of −45 degrees roll attitude and +10 pitch attitude corresponds to first pixel location (0, 90) and second pixel location (959,1049).

In determining the locations of the attitude-exclusive pixels in FIG. 9B, the PDS generator 130 could have been configured to determine a reference line decreasing in a 45 degree slope from left to right. Because there are 1400 pixels across the screen horizontally and the tangent of 45 degrees has a value of 1, the reference line would have to drop a distance of 1400 pixel rows in its run between columns 0 and 1399; however, this would not be possible because there are a maximum of 1050 pixels in the vertical direction. The left end point of the reference line would be 700 pixels above the pitch attitude midpoint. Because the pitch attitude is +10 degrees, the pitch attitude midpoint would be vertically displaced to the location of 790. Therefore, the left end point would be in column 0 at row 90 (790-700). Because the reference line passes through row 790 and the bottom pixel margin is located at row 1049, there are 259 more rows to drop before reaching the right end point. With a negative slope of 1, the reference line would run to the right a distance of 259 pixels from column 700 (the assigned roll attitude midpoint assumed for this example). Therefore, the right end point would be in row 1049 at column 959 (700+259).

Figure 10:
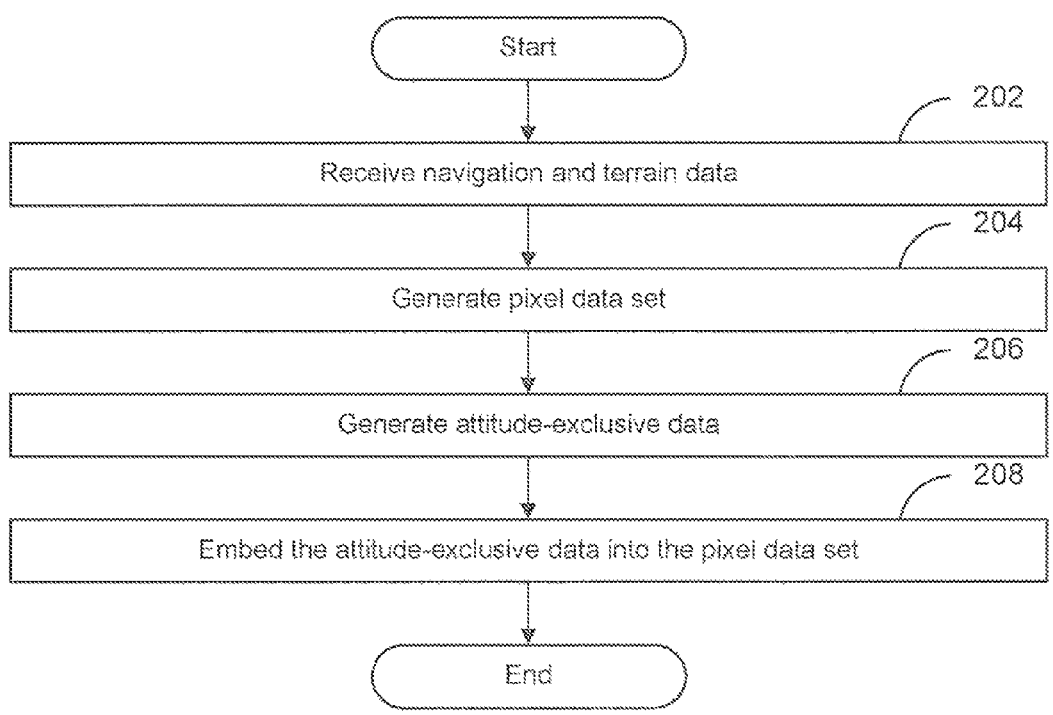
FIG. 10 depicts a flowchart of an exemplary method for embedding aircraft attitude data within a pixel data set.

FIG. 10 depicts a flowchart 200 of an example of a method for embedding aircraft attitude data within a pixel data set, where the PDS generator 130 may be programmed or configured with instructions corresponding to the following modules. As embodied herein, the PDS generator 130 may be a processor of a synthetic vision system. Also, the PDS generator 130 may be a processor of a module such as, but not limited to, a printed circuit card comprising one or more input interfaces to facilitate data communications with the PDS generator 130, i.e., the receiving and providing of data. As necessary for the accomplishment of the following modules embodied in FIG. 10, the receiving of data is synonymous and/or interchangeable with the retrieval of data, and the providing of data is synonymous and/or interchangeable with the making available or supplying of data.

The method begins with module 202 with the receiving of position data 112, orientation data 114, and terrain data. Position data 112 and orientation data 114 could be provided from navigation data source 110, and terrain data could be provided from the terrain data source 120.

The method continues with module 204 with the generating of a pixel data set representative of the scene outside the aircraft based upon position data 112, orientation data 114, and terrain data, where such generation is known to those skilled in the art. As stated above, the pixel data set representative of the scene may be scaled to fit a screen view. As illustrated above, the size of the display area of a screen used in the examples was assumed to have a horizontal width of 1400 pixels and a vertical width of 1050 pixels, and the size of the pixel data set was assumed to have 1400 columns extending between columns 0 and 1399 and 1050 rows extending between rows 0 and 1049.

The method continues with module 206 with the generating of attitude-exclusive data based upon attitude information provided in the orientation data 114. In one embodiment, attitude-exclusive data could comprise attitude-exclusive pixel data. The attitude-exclusive pixel data may be representative of first and second pixel locations which correspond to the aircraft attitude. As illustrated in the drawings of FIGS. 4 through 9, inclusive, the attitude-exclusive pixel data may correspond to these pixel locations determined in relation to a pixel-based attitude reference system. The PDS generator 130 may establish a pixel-based attitude reference system based upon a reference line (e.g., pixel row 550) passing through a reference point (e.g., 700, 550) at the reference attitude (e.g., straight-and-level) in relation to an outside reference (e.g., horizon line). The location of each attitude-exclusive pixel may coincide with the location of an end point of the reference line. Because a change to the aircraft attitude may be reflected by a change to the location of the reference line, the pixel locations of the attitude-exclusive pixel data change with the change in aircraft attitude. As embodied herein, the pixel locations of the attitude-exclusive pixel data may be configured to match the scale of attitude symbology data.

In an alternative embodiment, the first pixel location could correspond to a specific pitch attitude, and the second pixel location could correspond to a specific roll attitude, where a manufacturer could assign each attitude angle to a specific pixel location. The following example is provided for the purpose of illustration and not limitation. A manufacturer could assign two degrees pitch down to (0,540); one degree pitch down to (0,545); a zero pitch angle to first pixel location (0, 550); one degree pitch up to (0,555); two degrees pitch up to (0,560); and so forth. Similarly, second pixel location (690, 0) could be assigned two degrees roll right; (695,0) could be assigned one degree roll right; (700,0) could be assigned a zero roll angle; (705,0) could be assigned one degree roll left; (710,0) could be assigned two degrees roll left; and so forth.

In another embodiment, attitude-exclusive data could comprise attitude-exclusive ancillary data representative of aircraft attitude. Those skilled in the art are aware that data is typically generated in accordance to an established industry protocol standard. For example, ARINC 818 published by Aeronautical Radio, Incorporated provides a video interface and protocol standard for high bandwidth, low latency, uncompressed digital transmission in avionics systems. As part of the ARINC 818 protocol standard, fields of a data record are reserved for the placement and transmission of ancillary data. As embodied herein, data representative of aircraft attitude may be made part of such ancillary data field and embedded in the pixel data set by the PDS generator 130. Although this discussion has been drawn to ARINC 818, the embodiments disclosed herein are not limited to this standard but include any format and/or standard for which attitude data may be embedded with a pixel data set.

The method continues with module 208 with the embedding of attitude-exclusive data into the pixel data set to form an embedded pixel data set. In an embodiment where the attitude-exclusive data comprises attitude-exclusive ancillary data, attitude data may be placed or embedded in available data record fields of the pixel data set.

In an embodiment where the attitude-exclusive data comprises attitude-exclusive pixel data, the pixel data set could have been generated with pixel margins at the outer pixel borders of the pixel data set, e.g., columns 0 and 1399 and rows 0 and 1049, where these specific rows and columns could be reserved for attitude-exclusive pixels and not scene-representative pixels. As illustrated in the drawings of FIGS. 4 through 9, inclusive, pixel margins include attitude-exclusive pixels and exclude scene-representative pixels. When the image represented in the pixel columns 1 through 1398, inclusive, and pixel rows 1 through 1048, inclusive, is subsequently provided to a display unit, the image represented in those pixels may be displayed on the screen at the corresponding pixel locations.

Although the preceding discussion was drawn to pixel margins excluding scene-representative pixels, pixel margins may include scene-representative pixels. In such embodiment, attitude-exclusive pixels could be assigned a unique quality or characteristic to differentiate it from other data used to represent the scene. For example, a specific color could be assigned and reserved for the sole use of attitude-exclusive pixels, where such attitude-exclusive pixels are embedded in place of scene-representative pixels at the locations corresponding to location data.

Alternatively, a manufacturer or end-user could elect a configuration in which all of the pixels on the screen are used to display an image. If such election is made, the pixel data set could have been generated with additional columns and rows. For example, columns −1 and 1400 and/or rows −1 and 1050 could be created and used as margins, reserving these specific rows and columns for attitude-exclusive pixels.

After the embedded pixel data set has been formed, it may be used as source data for the subsequent validation of attitude information. For instance, the embedded pixel data set could be provided to the data comparator 140 for the detection of inconsistent attitude information as discussed in flowchart 300 embodied in FIG. 11. Then, the flowchart proceeds to the end.

Figure 11:
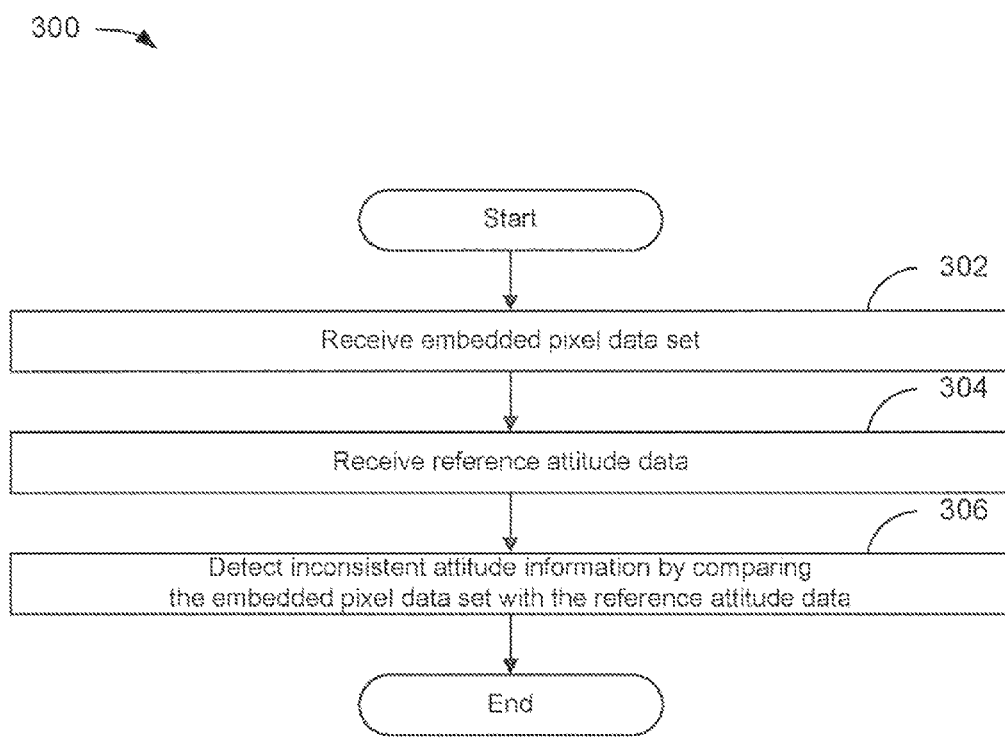
FIG. 11 depicts a flowchart of an exemplary method for detecting inconsistent aircraft attitude information.

FIG. 11 depicts a flowchart 300 of an example of a method for detecting inconsistent aircraft attitude information, where data comparator 140 may be programmed or configured with instructions corresponding to the following modules. As embodied herein, the data comparator 140 may be a processor of an indicating system comprising one or more display units. Also, the data comparator 140 may be a processor of a module such as, but not limited to, a printed circuit card comprising one or more input interfaces to facilitate data communications with the data comparator 140, i.e., the receiving and providing of data. As necessary for the accomplishment of the modules embodied in FIG. 11, the receiving of data is synonymous and/or interchangeable with the retrieval of data, and the providing of data is synonymous and/or interchangeable with the making available or supplying of data.

The flowchart begins with module 302 with the receiving of an embedded pixel data set from an embedded pixel data source comprised of attitude-exclusive data. In one embodiment, attitude-exclusive data comprises attitude-exclusive pixel data, where such attitude-exclusive pixel data is representative of first and second pixel locations corresponding to aircraft attitude. In another embodiment, attitude-exclusive data comprises attitude-exclusive ancillary data. Such an embedded pixel data set could be provided from the PDS generator 130.

The flowchart continues with module 304 with the receiving of reference attitude data from a reference attitude data source, where the reference attitude data is representative of one or more measurements of aircraft orientation such as, but not limited to, pitch and/or roll attitudes. In one embodiment, reference attitude data could comprise orientation data 114 provided by the same navigation data source which provided the basis for the generation of the embedded pixel data set, or reference attitude data could comprise orientation data 114 provided by a second navigation data source. In another embodiment, reference attitude data could comprise a second embedded pixel data set provided by a second PDS generator 130.

The flowchart continues with module 306 with the detecting of inconsistent attitude information by comparing the attitude-exclusive data of the embedded pixel data set with the reference attitude data. In an embodiment where attitude-exclusive data comprises attitude-exclusive pixel data, the first and second pixel locations may be used to determine one or more measurements of aircraft attitude. In one procedure, the first pixel location could correspond to a specific pitch attitude, and the second pixel location could correspond to a specific roll attitude, where a manufacturer could assign each attitude angle to specific a pixel location as discussed above. In another procedure, the slope of a line connecting the two pixel locations may used to measure roll attitude, and the vertical displacement of the line in relation to a reference point may be used to measure pitch attitude, and the drawings of FIGS. 8B and 9B may be used to illustrate this procedure.

As shown in FIG. 8B, first pixel location is (0, 535) and the second pixel location is (1399, 1045). Here, the slope may be determined from the rise of −510 (535-1045) over the run of 1399 (1399-0), which equals −0.364546. Applying the tangent function, the roll angle is determined to be −20.0 degrees, i.e., 20 degrees left turn. Because the reference point has been assumed to be at (700, 550), the row of the line passing through column 700 may be determined by subtracting the negative product of the slope and pixel column of the reference point from the row of the first pixel location (535-(−0.364546*700), which equals row 790 which, in turn, corresponds to a vertical displacement of −240 pixel rows (550-790). Because one degree of pitch has been set to equal 24 pixel rows as assumed above, the pitch angle has been determined to be −10.0 degrees (−240/24), i.e., 10 degrees nose down.

As shown in FIG. 9B, the first pixel location is (0, 90) and the second pixel location is (959, 1049). Here, the slope may be determined from the rise of −959 (90-1049) over the run of 959 (959-0), which equals −1.0. Applying the tangent function, the roll angle is determined to be −45.0 degrees, i.e., a 45 degree left turn. The row of the line passing through column 700 may be determined to be row 790 (90-(−1.0*700)), which corresponds to a pitch angle of −10.0 degrees, i.e., 10 degrees nose down, as discussed in the preceding paragraph.

In one embodiment where the reference attitude data comprises orientation data 114 received from the navigation data source 110, the one or more measurements of aircraft attitude determined from attitude-exclusive pixel data of the embedded pixel data set may be compared with the respective measurements of the reference attitude data. If the values of the respective pitch and/or roll angles do not equal each other within configurable tolerances, then inconsistent attitude information has been detected. For the purpose of illustration and not limitation, maximum angular differences could be established as a limit(s) of tolerance, and the maximum angular difference of pitch angles could differ from the maximum angular difference of roll angles.

In another embodiment where the reference attitude data comprises orientation data received from the navigation data source 110, the one or more measurements of aircraft attitude may be converted to second attitude-exclusive data. That is, second attitude-exclusive data may be generated from the attitude data, where such second attitude-exclusive data is representative of third and fourth pixel locations. Such generation may be performed as discussed above in module 206. Then, third and fourth pixel locations may be compared with the first and second pixel locations for the detection of inconsistent attitude information. That is, inconsistent attitude information could be detected by comparing the first and third locations and second and fourth locations, respectively. If the values of the first and third locations and/or second and fourth locations do not equal each other within a configurable tolerance, then inconsistent attitude information has been detected. For the purpose of illustration and not limitation, a maximum linear difference between first and third pixel locations, second and fourth pixel locations, or both could be established as a limit of tolerance. As embodied herein, the navigation data source which provided the reference attitude data may be the same source from which the first and second locations of the embedded pixel data set were determined.

In an embodiment where the reference attitude data comprises a second embedded pixel data set, third and fourth pixel locations of the second embedded pixel data set may be compared with the first and second pixel locations for the detection of inconsistent attitude information. That is, inconsistent attitude information could be detected by comparing the first and third locations and second and fourth locations, respectively. As discussed in the preceding paragraph, if the values of the first and third locations and/or second and fourth locations do not equal each other within a configurable tolerance, then inconsistent attitude information has been detected.

In another embodiment where the attitude-exclusive data comprises attitude-exclusive ancillary data and the reference attitude data comprises orientation data 114 received from the navigation data source 110, the one or more measurements of aircraft attitude represented attitude-exclusive ancillary data may be compared with the respective measurements of the reference attitude data. If the values of the respective pitch and/or roll angles do not equal each other within configurable tolerances, then inconsistent attitude information has been detected. For the purpose of illustration and not limitation, maximum angular differences could be established as a limit(s) of tolerance, and the maximum angular difference of pitch angles could differ from the maximum angular difference of roll angles.

If inconsistent attitude data is not detected, the embedded pixel data set may be considered validated and ready for subsequent use. In one embodiment when inconsistent attitude is not detected, the data comparator 140 may send a signal to the PDS generator 130. Then, the PDS generator 130 may provide the embedded pixel data set to the display unit 150, whereby a subset of the embedded pixel data set could be merged with reference attitude data to form an image data set representative of an image of attitude symbology against the background of the three-dimensional scene outside the aircraft.

In another embodiment when inconsistent attitude is not detected, the data comparator 140 may provide the embedded pixel data set and the reference attitude data representative of at least one measurement of aircraft attitude to the display unit 150, whereby a subset of the embedded pixel data set could be merged with reference attitude data to form an image data set representative of an image of attitude symbology against the background of the three-dimensional scene outside the aircraft. Then, the flowchart proceeds to the end.

It should be noted that the method steps described above may be embodied in computer-readable media as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all modifications, permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations, enhancements, and equivalents as falling within the true spirit and scope of the present invention.

What is claimed is:

1. A system for detecting inconsistent aircraft attitude information, said system comprising:
   a pixel data set generator configured to provide attitude-exclusive data embedded in a pixel data set;
   a source of reference attitude data; and
   a processor configured to
      receive an embedded pixel data set,
      receive the reference attitude data,
      detect inconsistent attitude information by comparing the attitude-exclusive data of the embedded pixel data set with the reference attitude data, and
      provide the embedded pixel data set to at least one user device or system if inconsistent attitude information is not detected.

2. The system of claim 1, wherein
   the attitude-exclusive data is comprised of attitude-exclusive pixel data representative of a first pixel location and a second pixel location,
   the source of reference attitude data is a navigation data source, where the reference attitude data is representative of at least one measurement of aircraft attitude, and
   the processor is further configured to
      compare each measurement of aircraft attitude represented in the attitude-exclusive pixel data with the respective attitude measurement of the reference attitude data, where
         each attitude measurement of aircraft attitude represented in the attitude-exclusive pixel data is determined from the first pixel location and second pixel location, and
      detect inconsistent attitude information when at least one measurement does not equal the respective measurement of the other within a specified tolerance, where
         equality is measured within a specified tolerance.

3. The system of claim 2, wherein
   the measurement of roll attitude is determined by the slope of a line connecting the first pixel location and second pixel location,
   the measurement of pitch attitude is determined by the vertical displacement of the line in relation to a reference point, or
   both.

4. The system of claim 2, wherein
   the measurement of pitch attitude is determined from the first pixel location, the measurement of roll attitude is determined from the second pixel location, or both.

5. The system of claim 1, wherein
   the attitude-exclusive data is comprised of attitude-exclusive pixel data representative of a first pixel location and a second pixel location,
   the pixel data set generator is a first pixel data set generator,
   the source of reference attitude data is a second pixel data set generator, where
      the reference attitude data is comprised of second attitude-exclusive pixel data representative of a third pixel location and a fourth pixel location, and
   the processor is further configured to
      compare the first pixel location and second pixel location with the third pixel location and fourth pixel location, respectively, and
      detect inconsistent attitude information when
         the first pixel location and third pixel location do not equal each other, or
         the second pixel location and fourth pixel location do not equal each other, where
            equality is measured within a specified tolerance.

6. The system of claim 1, wherein
   the attitude-exclusive data is comprised of first attitude-exclusive pixel data representative of a first pixel location and a second pixel location,
   the source of reference attitude data is a navigation data source, where
      the reference attitude data is representative of measurements of aircraft attitude, and
   the processor is further configured to
      generate second attitude-exclusive pixel data from the reference attitude data, where
         the second attitude-exclusive pixel data is representative of a third pixel location and a fourth pixel location,
      compare the first pixel location and second pixel location with the third pixel location and fourth pixel location, respectively, and
      detect inconsistent attitude information when
         the first pixel location and third pixel location do not equal each other, or
         the second pixel location and fourth pixel location do not equal each other, where
            equality is measured within a specified tolerance.

7. The system of claim 1, wherein
   the attitude-exclusive data is comprised of attitude-exclusive ancillary data representative of aircraft attitude,
   the source of reference attitude data is a navigation data source, where
      the reference attitude data is representative of at least one measurement of aircraft attitude, and
   the processor is further configured to
      compare each measurement of aircraft attitude represented in the attitude-exclusive ancillary data with the respective attitude measurement of the reference attitude data, and
      detect inconsistent attitude information when at least one measurement does not equal the respective measurement of the other within a specified tolerance, where
         equality is measured within a specified tolerance.

8. The system of claim 1, wherein
   the processor is further configured to
      send a signal to the pixel data set generator when inconsistent attitude information is not detected,
   the pixel data set generator is further configured to
      receive the signal, and
      provide the embedded pixel data set to a display unit, and
   the display unit is configured to
      receive the embedded pixel data set,
      receive attitude data representative of at least one measurement of aircraft attitude from a navigation data source,
      merge a subset of the embedded pixel data set with the attitude data to form an image data set representative of an image of attitude symbology against the background of the three-dimensional scene outside the aircraft, and
      present the image represented in the image data set on the screen of the display unit.

9. The system of claim 1, wherein
the processor is further configured to provide the embedded pixel data set and the reference attitude data representative of at least one measurement of aircraft attitude to a display unit when inconsistent attitude information is not detected, and the display unit is configured to
receive the embedded pixel data set and the reference attitude data,
merge a subset of the embedded pixel data set with the reference attitude data to form an image data set representative of an image of attitude symbology against the background of the three-dimensional scene outside the aircraft, and
present the image represented in the image data set on the screen of the display unit.

10. A method for detecting inconsistent aircraft attitude information said method performed by a processor, said method comprising:
receiving attitude-exclusive data embedded in a pixel data set from a pixel data set generator,
receiving reference attitude data from a reference attitude data source;
detecting inconsistent attitude information by comparing the attitude-exclusive data of the embedded pixel data set with the reference attitude data; and
providing the embedded pixel data set to at least one user device or system if inconsistent attitude information is not detected.

11. The method of claim 10, wherein
the attitude-exclusive data is comprised of attitude-exclusive pixel data representative of a first pixel location and a second pixel location,
the reference attitude data is representative of at least one measurement of aircraft attitude, such that
each measurement of aircraft attitude represented in the attitude-exclusive pixel data is compared with the respective attitude measurement of the reference attitude data, where
each attitude measurement of aircraft attitude represented in the attitude-exclusive pixel data is determined from the first pixel location and second pixel location, and
inconsistent attitude information is detected when at least one measurement does not equal the respective measurement of the other within a specified tolerance, where
equality is measured within a specified tolerance.

12. The method of claim 11, wherein
the measurement of roll attitude is determined by the slope of a line connecting the first pixel location and second pixel location,
the measurement of pitch attitude is determined by the vertical displacement of the line in relation to a reference point, or
both.

13. The method of claim 11, wherein
the measurement of pitch attitude is determined from the first pixel location,
the measurement of roll attitude is determined from the second pixel location, or both.

14. The method of claim 10, wherein
the attitude-exclusive data is comprised of attitude-exclusive pixel data representative of a first pixel location and a second pixel location,
the reference attitude data is comprised of second attitude-exclusive pixel data representative of third and fourth pixel locations corresponding to aircraft attitude, such that the first pixel location and second pixel location are compared with the third pixel location and fourth pixel location, respectively, and
inconsistent attitude information is detected when
the first pixel location and third pixel location do not equal each other, or
the second pixel location and fourth pixel location do not equal each other, where
equality is measured within a specified tolerance.

15. The method of claim 10, wherein
the attitude-exclusive data is comprised of first attitude-exclusive pixel data representative of a first pixel location and a second pixel location, and
the reference attitude data is representative of at least one measurement of aircraft attitude, such that
second attitude-exclusive pixel data is generated from the reference attitude data, where
the second attitude-exclusive pixel data is representative of a third pixel location and a fourth pixel location,
the first pixel location and second pixel location are compared with the third pixel location and fourth pixel location, respectively, and
inconsistent attitude information is detected when
the first pixel location and third pixel location do not equal each other, or
the second pixel location and fourth pixel location do not equal each other, where
equality is measured within a specified tolerance.

16. The method of claim 10, wherein
the attitude-exclusive data is comprised of attitude-exclusive ancillary data representative of aircraft attitude, and
the reference attitude data is representative of at least one measurement of aircraft attitude, such that
each measurement of aircraft attitude represented in the attitude-exclusive ancillary data is compared with the respective attitude measurement of the reference attitude data, and
inconsistent attitude information is detected when at least one measurement does not equal the respective measurement of the other within a specified tolerance, where
equality is measured within a specified tolerance.

17. The method of claim 10, further comprising:
sending a signal to the pixel data set generator when inconsistent attitude information is not detected, such that
the embedded pixel data set is provided to a display unit, whereby
a subset of the embedded pixel data set is merged with attitude data to form an image data set representative of an image of attitude symbology against the background of the three-dimensional scene outside the aircraft, and
the image represented in the image data set is presented on the screen of the display unit.

18. The method of claim 10, further comprising:
providing the embedded pixel data set and the reference attitude data representative of at least one measurement of aircraft attitude to a display unit when inconsistent attitude information is not detected, whereby
a subset of the embedded pixel data set is merged with the reference attitude data to form an image data set representative of an image of attitude symbology against the background of the three-dimensional scene outside the aircraft, and the image represented in the image data set is presented on the screen of the display unit.

* * * * *